United States Patent [19]

Fetter

[11] Patent Number: 4,911,596
[45] Date of Patent: Mar. 27, 1990

[54] TRACTOR ACCESSORY FOR MOVING ROUND BALES

[76] Inventor: Melvin Fetter, P.O. Box 287, Mexia, Tex. 76667

[21] Appl. No.: 231,507

[22] Filed: Aug. 12, 1988

[51] Int. Cl.$^4$ .......................... A01D 87/12; B60P 1/64
[52] U.S. Cl. .................................... 414/24.5; 414/721; 414/920; 280/481
[58] Field of Search ..................... 414/24.5, 24.6, 546, 414/551, 685, 721, 722, 785, 920; 280/481, 759, 760; 294/61, 120, 122; 37/231, 235, 236, 266; 172/817, 829; 293/117

[56] References Cited

U.S. PATENT DOCUMENTS

| | | |
|---|---|---|
| 2,191,323 | 2/1940 | Richter ................................. 37/231 |
| 2,430,221 | 11/1947 | Frink et al. ......................... 37/231 |
| 3,098,309 | 7/1963 | Koch ................................... 37/231 |
| 3,921,837 | 11/1975 | Vandewater . |
| 3,934,726 | 1/1976 | Martin . |
| 4,099,629 | 7/1978 | Cox . |
| 4,120,405 | 10/1978 | Jones et al. . |
| 4,256,426 | 3/1981 | Buss . |
| 4,275,985 | 6/1981 | Schremmer . |
| 4,299,522 | 11/1981 | Barton et al. . |
| 4,306,825 | 12/1981 | Yilit . |
| 4,329,103 | 5/1982 | Miller . |
| 4,413,940 | 11/1983 | Southard et al. ............... 280/760 X |
| 4,537,549 | 8/1985 | Knels . |
| 4,674,786 | 6/1987 | Lynch . |
| 4,674,933 | 6/1987 | Brown . |
| 4,790,558 | 12/1988 | Ellis ............................. 414/24.5 X |

FOREIGN PATENT DOCUMENTS

| | | |
|---|---|---|
| 1189030 | 6/1985 | Canada .............................. 414/24.5 |
| 2596944 | 10/1987 | France ............................... 414/24.5 |
| 2194212 | 3/1988 | United Kingdom ............... 414/24.5 |

Primary Examiner—Kevin P. Shaver
Assistant Examiner—Edward S. Ammeen
Attorney, Agent, or Firm—Michael A. O'Neil

[57] ABSTRACT

A tractor mounted accessory for handling round bales comprises an attachment frame adapted to receive a bar extending across the front of the tractor to support the accessory on the tractor. A pivoting frame is pivotally supported on the attachment frame and has a pair of round bale engaging forks extending forwardly therefrom. A hydraulic cylinder controls the pivotal relationship between the attachment frame and the pivoting frame and thereby controls the positioning of the forks relative to the tractor. The hydraulic cylinder is actuated by the hydraulic system of the tractor.

9 Claims, 2 Drawing Sheets

TRACTOR ACCESSORY FOR MOVING ROUND BALES

TECHNICAL FIELD

This invention relates generally to apparatus for moving round hay bales, and more particularly to an accessory mountable at the front of a conventional tractor and adapted for actuation by the hydraulic system of the tractor to receive and move round bales.

BACKGROUND OF THE INVENTION

Traditionally, hay and other agricultural materials have been compacted into relatively small rectangular bales for storage, etc. Because of their size and weight, the old-style rectangular bales were adapted for manual handling. More recently the use of so-called round bales has become popular. Round bales are actually cylindrical in shape and are characterized by diameters of about 6 ft. or more and by axial lengths of about 3 ft. or more. Due to their considerable mass and volume, round bales cannot be handled manually; rather, the use of a mechanical device is necessary in order to properly manipulate round bales.

Heretofore various tractor-mounted devices have been provided for use in handling round bales. Prior round bale handling mechanisms have generally been of two types: rear mounted devices and front mounted devices. The rear mounted devices have typically comprised forks or prongs extending rearwardly from the tractor and supported on the hitching mechanism of the tractor for actuation thereby. The front mounted devices have comprised additional accessories adapted for use with apparatus permanently affixed to the tractor for actuating such attachments as lifting forks, dozer blades, etc.

SUMMARY OF THE INVENTION

The present invention comprises apparatus for manipulating round bales which differs from the prior art in that it comprises an accessory readily mountable at the front-end of a tractor and adapted for actuation by the hydraulic system of the tractor to receive and transport round bales. As opposed to prior approaches for round bale handling, the accessory of the present invention is entirely self-contained and does not depend on other tractor mounted structure for its actuation.

In accordance with the broader aspects of the invention, a round bale handling apparatus includes an attachment frame adapted to receive a bar extending across the front end of a tractor. The attachment frame includes an upper portion extending over and behind the bar of the tractor, a pair of depending brackets having fastening receiving holes formed there through, and a lower portion which is selectively secured to the brackets to engage the underside of the bar and thereby prevent disengagement between the bar and the attachment frame.

The attachment frame further includes a tubular member extending transversely across the front of the tractor parallel to the supporting bar. A pivoting frame includes a first tubular member extending through and pivotally supported by the tubular member of the attachment frame. Second and third tubular members are secured to and extend forwardly from the opposite ends of the first tubular member. A triangular housing includes sidewalls extending angularly, upwardly and inwardly from the second and third tubular members and a front wall, all of which serve to rigidly interconnect the second and third tubular members of the pivoting frame.

A pair of forks are detachably secured in the second and third tubular members of the pivoting frame and extend forwardly therefrom. A hydraulic cylinder is secured between the attachment frame and the pivoting frame and is adapted for actuation by the hydraulic system of the tractor to selectively position the pivoting frame relative to the attachment frame. In this manner the forks are selectively positioned by the hydraulic cylinder to first receive and thereafter raise a round bale for handling by the tractor.

DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
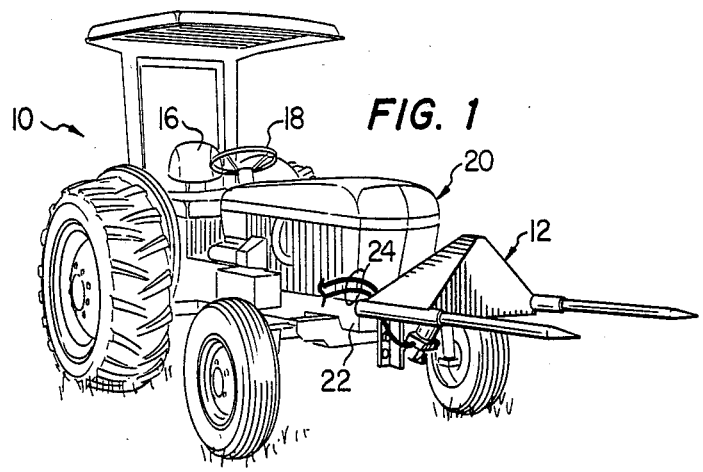
FIG. 1 is a front perspective view of a tractor equipped with an accessory for handling round bales incorporating the present invention.

Referring now to FIG. 1, there is shown a conventional tractor 10 provided with an accessory for handling round bales 12 incorporating in the present invention. The tractor 10 includes an operator's compartment 14 which in turn includes a seat 16, a steering wheel 18, and controls for regulating the operation of the tractor 10. An engine compartment 20 extends forwardly from the operator's compartment 16 and includes the engine and other operating instrumentalities of the tractor 10. A bar 22 extends transversely across the front-end of the tractor 10 and serves to receive and support the accessory 12. The accessory 12 is operably connected to the hydraulic system of the tractor 10 by means of a pair of hydraulic lines 24.

Figure 2:
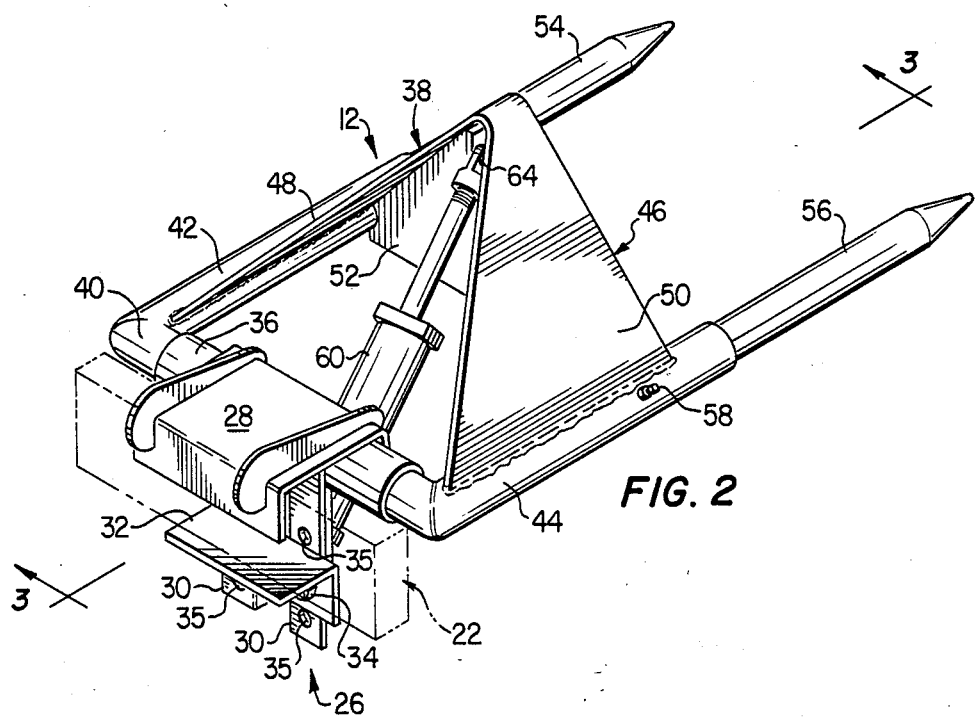
FIG. 2 is an enlarged rear perspective view of the accessory for handling round bales of FIG. 1.

As best shown in FIG. 2, the accessory 12 for handling round bales of the present invention includes an attachment frame 26 which receives the bar 22 of the tractor to secure the accessory 12 thereto. The attachment frame 26 includes an upper portion 28 extending over and behind the bar 22. A pair of brackets 30 extend downwardly from the upper portion 28 and are provided with a plurality of fastener receiving hole 35. The attachment frame 26 further includes a lower portion 32 which is secured to the brackets 30 by means of appropriate fasteners 34 and is positioned to engage the underside of the bar 22, thereby preventing disengagement of the attachment frame 26 therefrom.

The attachment frame 26 further includes a relatively large diameter tubular member 36 which extends transversely across the front of the tractor 10 generally parallel to bar 22. A pivoting frame 38 includes a first tubular member 40 extending through and pivotally supported by the tubular member 36 of the attachment frame 26. The inner diameter of the first tubular member 40 of the pivoting frame 38 is closely matched to the outer diameter of the tubular member 36 of the attachment frame 26 so that the tubular member 40 is snugly but pivotally supported by the tubular member 36. Various conventional techniques may be utilized to afford lubrication between the tubular member 40 and the tubular member 36, if desired.

Pivoting frame 38 further includes a second tubular member 42 and a third tubular member 44 which are secured to and extend forwardly from the first tubular member 40. A triangular housing 46 includes a first wall 48 extending angularly upwardly and inwardly from the second tubular member 42, a second wall 50 extending angularly upwardly and inwardly from the third tubular member 44, and a front wall 52 secured to the front ends of the walls 48 and 50. The triangular housing 46 serves to rigidly interconnect and to prevent relative movement between the second tubular members 42 and 44 of the pivoting frame 38.

A pair of forks 54 and 56 are mounted in the second and third tubular members 42 and 44, respectively, of the pivoting frame 38 and extend forwardly therefrom. The forks 54 and 56 are detachably secured to the tubular members 42 and 44 of the pivoting frame 38 by means of set screws 58. This allows the forks 54 and/or 56 to be removed from the pivoting frame 38 in the event of damage, to facilitate shipping, etc.

Figure 3:
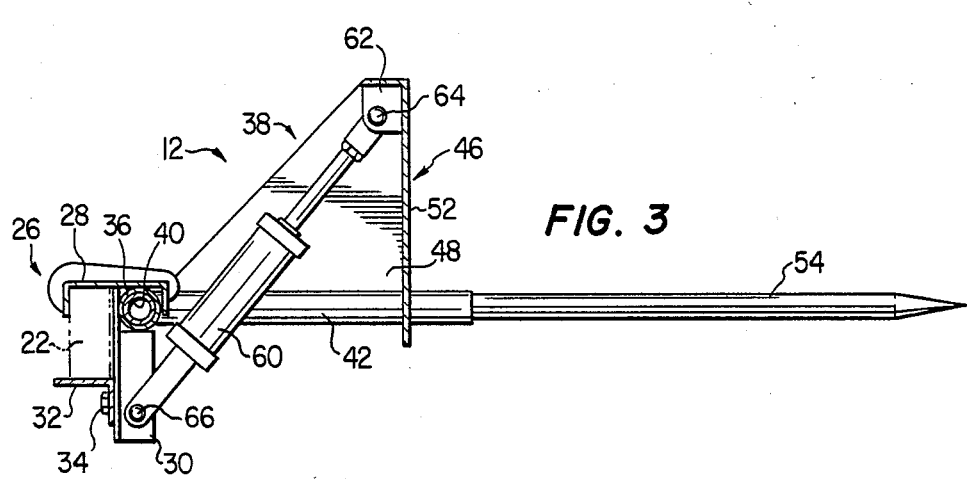
FIG. 3 is a sectional view taken generally along the lines 3—3 in FIG. 1 in the direction of the arrows.

A hydraulic cylinder 60 is connected between the attachment frame 26 and the pivoting frame 38 of the accessory 12. As is most clearly shown in FIG. 3, the upper end of the hydraulic cylinder is connected to a bracket 62 secured in the triangular housing 46 by a pin 64, and the lower end of the hydraulic cylinder 60 is connected to the brackets 30 of the attachment frame 26 by pin 66. Upon actuation, the hydraulic cylinder functions to control the pivotal relationship between the attachment frame 26 and the pivoting frame 38 of the accessory 12, and in this manner controls the positioning of the forks 54 and 56 relative to the tractor 10.

Figure 4A:
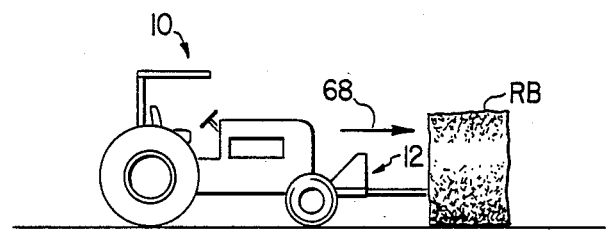
FIGS. 4(a) and 4(b) are diagrammatic illustrations of the use and operation of the accessory of the present invention in the handling of round bales.
Figure 4B:
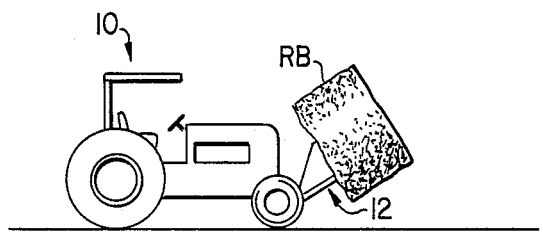

The operation of the accessory for handling round bales 12 of the present invention is best illustrated in FIGS. 4(a) and 4(b). Initially, the hydraulic cylinder 60 is actuated to position the forks 54 and 56 of the accessory 12 generally parallel to the underlying surface. Thereafter, the tractor 10 is actuated to move forwardly in the direction of the arrow 68 to engage the forks of the accessory 12 with a round bale RB, thereby impaling the round bale RB on the forks 54 and 56 of the accessory 12. After the forks of the accessory 12 have engaged the round bale RB, the hydraulic cylinder 60 is actuated to pivot the pivoting frame 38 and therefore the forks 54 and 56 upwardly relative to the attachment frame 26 and the tractor 10. After the hydraulic cylinder has raised the forks 54 and 56 sufficiently to disengage the round bale RB from the underlying surface, the tractor 10 is actuated to position the round bale RB as desired.

Figure 5:
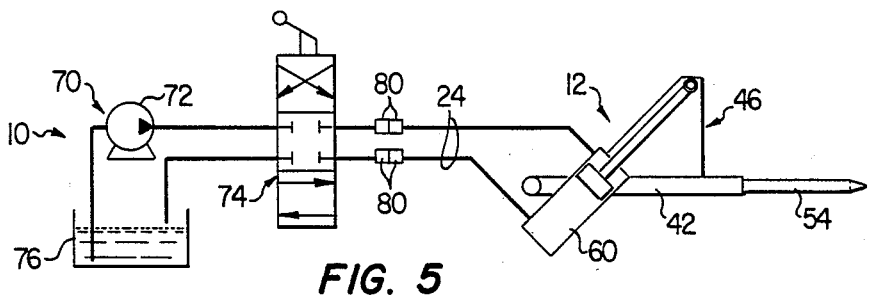
FIG. 5 is a diagrammatic illustration of the hydraulic system utilized to actuate the accessory for handling round bales of the present invention.

Referring to FIG. 5, the tractor 10 is provided with a hydraulic system including a pump 72 typically mounted in the engine compartment 20 and a valve 74 typically mounted in the operator's compartment 14 of the tractor 10. The valve 74 serves to control the flow of pressurized hydraulic fluid from the pump 72 and the return of spent hydraulic fluid to a reservoir 76. The hydraulic lines 24 of the accessory 12 are connected to the hydraulic system 70 of the tractor by means of connectors 80. Thus, upon actuation of the valve 74 the hydraulic lines 24 serve to direct pressurized hydraulic fluid to and to return spent hydraulic fluid from the hydraulic cylinder 60, thereby controlling the positioning of the forks 54 and 56 of the accessory 12 relative to the tractor 10.

Although preferred embodiments of the invention have been illustrated in the accompanied Drawings and described in the foregoing Detailed Description, it will be understood that the invention is not limited to the embodiment disclosed, but is capable of numerous rearrangements, modifications, and substitutions of parts and elements without departing from the spirit of the invention.

I claim:

1. A tractor accessory for attachment to a tractor frame, said frame having a rectangular bar integrally formed with and extending transversely across the front of the tractor, said accessory being used for handling round bales and comprising:

an attachment frame adapted to receive said rectangular bar extending transversely across the front of the tractor and to thereafter support the accessory on the tractor;

a pivoting frame;

a tubular member integrally formed with the attachment frame and extending transversely across the front of the tractor;

said pivoting frame including a first elongated cylindrical member inserted in and having ends thereof extending beyond the ends of said tubular member for pivotally supporting said pivoting frame about an axis extending transversely across the front of the tractor;

at least one hydraulic cylinder connected between the attachment frame and the pivoting frame for selective actuation to pivot the pivoting frame cylindrical member relative to the attachment frame tubular member;

means connecting the hydraulic cylinder to the hydraulic system of the tractor for selective actuation thereby; and a pair of round bale engaging forks mounted on the pivoting frame and extending forwardly therefrom for selective positioning under the action of the hydraulic cylinder to receive a round bale and to lift the round bale relative to the tractor to facilitate positioning of the round bale under the action of the tractor.

2. A tractor accessory as in claim 1 wherein said attachment frame comprises:

an upper portion extending over the top and down behind said rectangular tractor bar;

at least one bracket depending from said upper portion and having fastener receiving orifices; and a lower portion selectively secured to said depending bracket with said fastener receiving orifices for engaging the underside of said bar to prevent disengagement of the attachment frame from said bar.

3. A tractor accessory as in claim 2 wherein said pivoting frame comprises:

second and third elongated cylindrical members secured to and extending forwardly from the respective ends of the first cylindrical member;

a fork rod attached to and extending forward from each of said second and third cylindrical member; and a housing rigidly connecting said second and third elongated cylindrical members to prevent relative movement of said second and third members.

4. A tractor accessory as in claim 3 wherein said upper portion of the attachment freame is L-shaped to extend over the top and downbehind said bar.

5. A tractor accessory as in claim 4 wherein said first elongated cylindrical member is a hollow tube having an outer diameter closely matched to the inner diameter of said transverse tubular member so that a snug but pivotal fit is obtained.

6. A tractor accessory as in claim 5 wherein:
   said second and third elongated cylindrical members are hollow tubes; and
   said fork rods each have an outer diameter sufficient for insertion in and attachment to one of said second and third cylindrical members.

7. A tractor accessory as in claim 6 further including means for detachably securing said fork rods within said second and third cylindrical members.

8. A tractor accessory as in claim 3 wherein said rigid housing connecting said second and third cylindrical members comprises:
   a first side wall extending angularly, upwardly and inwardly from the second cylindrical member;
   a second side wall extending angularly, upwardly and inwardly from the third cylindrical member and joined to said first side wall to form a triangular housing; and
   a front wall secured to the front edges of the first and second side walls.

9. A tractor accessory as in claim 8 further including:
   a first connection bracket secured to said triangular housing;
   a second connection bracket secured to said depending bracket on the attachment frame; and
   means for coupling the hydraulic cylinder between the first and second connection brackets to pivot the pivoting frame relative to the attachment frame.

* * * * *